United States Patent [19]

Brown et al.

[11] Patent Number: 5,174,192

[45] Date of Patent: Dec. 29, 1992

[54] PISTON, METHOD OF MAKING THE PISTON AND PISTON AND CYLINDER UNIT COMPRISING THE PISTON

[75] Inventors: Peter E. Brown, Bridgnorth; Brian W. Perrins, Stourbridge, both of United Kingdom

[73] Assignee: Jebron Limited, Wednesbury, United Kingdom

[21] Appl. No.: 776,619

[22] Filed: Oct. 15, 1991

[30] Foreign Application Priority Data

Oct. 17, 1990 [GB] United Kingdom ............... 9022467

[51] Int. Cl.⁵ .................................... F01B 29/00
[52] U.S. Cl. .................................. 92/128; 92/241;
92/245; 92/255; 29/888.04; 29/888.044;
72/348; 72/334
[58] Field of Search ............... 92/240, 241, 242, 243,
92/244, 245, 255, 128; 29/888.04, 888.044;
72/348, 334

[56] References Cited

U.S. PATENT DOCUMENTS

| 1,939,683 | 12/1933 | Foehr | 92/245 |
| 2,129,619 | 8/1938 | Longstreet | 92/245 |
| 2,305,282 | 12/1942 | Taylor, Jr. et al. | 29/888.04 |
| 4,329,916 | 5/1982 | Roeder | 92/240 |

FOREIGN PATENT DOCUMENTS

| 462255 | 7/1928 | Fed. Rep. of Germany . | |
| 1207247 | 2/1960 | France | 92/240 |
| 0269938 | 11/1986 | Japan | 72/348 |
| 478445 | 1/1938 | United Kingdom . | |
| 598001 | 2/1948 | United Kingdom | 92/240 |
| 997662 | 7/1965 | United Kingdom . | |

Primary Examiner—Thomas E. Denion
Attorney, Agent, or Firm—Webb Burden Ziesenheim & Webb

[57] ABSTRACT

A piston for a door closer comprises metal cups on opposite ends of a stem. A plastics ring is a snap-fit in one of the cups and protrudes from that cup to seal against the wall of a cylinder. A groove in the side wall of the cup for receiving a rib on the ring is formed by pressing a substantially flat blank before the blank is formed into the cup.

4 Claims, 1 Drawing Sheet

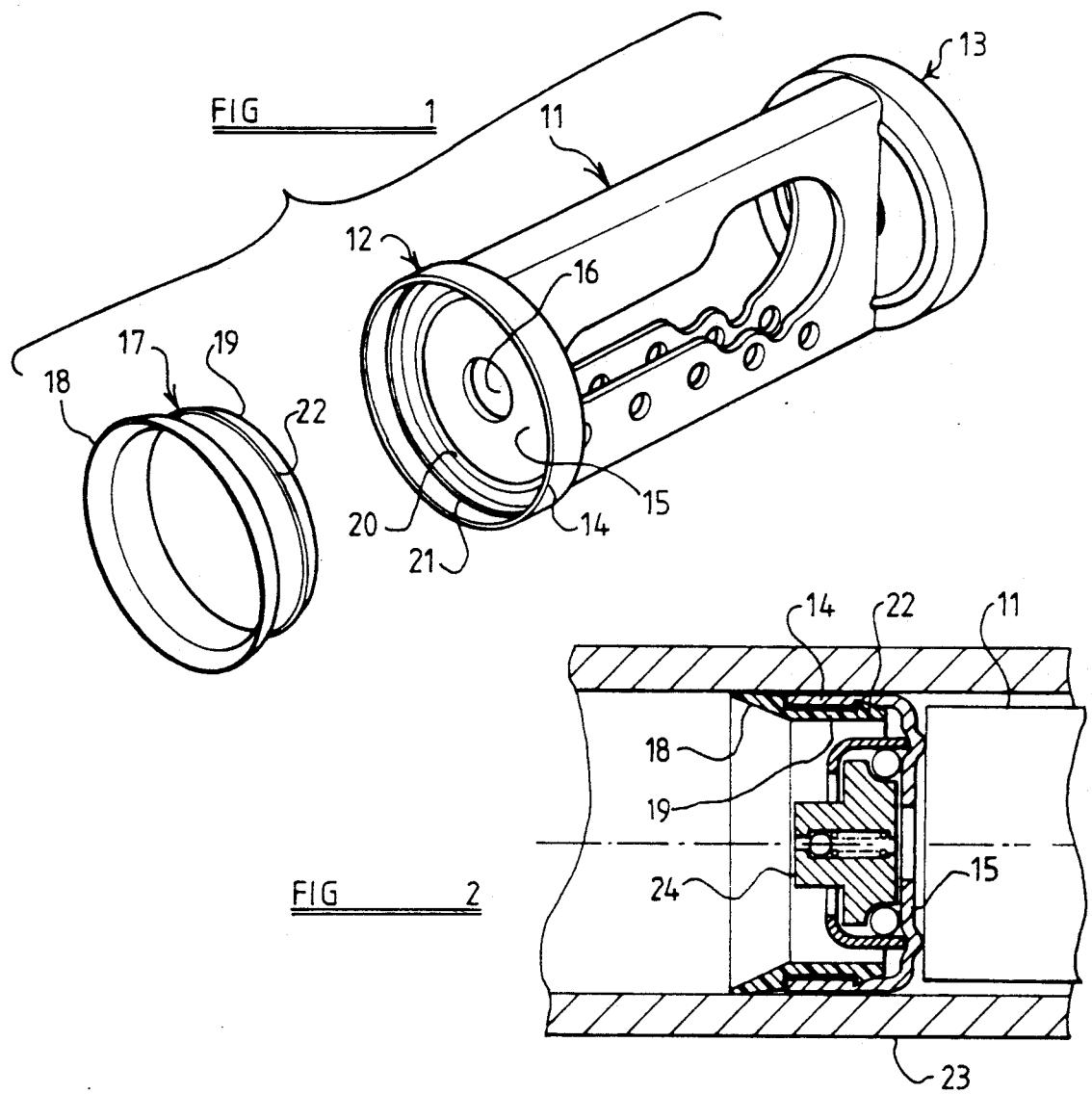
FIG 1
FIG 2
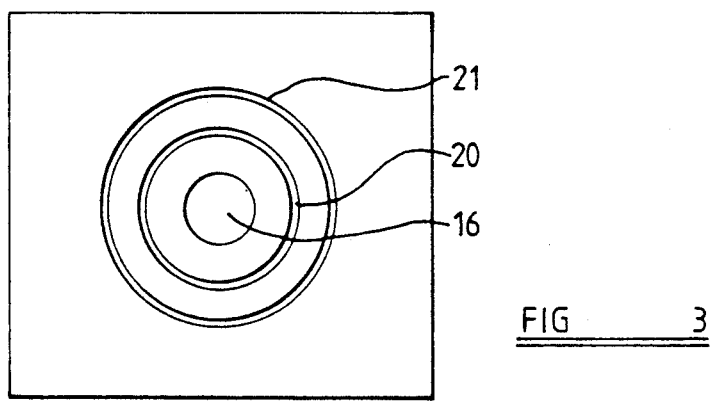
FIG 3

PISTON, METHOD OF MAKING THE PISTON AND PISTON AND CYLINDER UNIT COMPRISING THE PISTON

BACKGROUND TO THE INVENTION

From one aspect, the present invention relates to a method of making a piston. It is known to form a piston by combining with a piston body a relatively flexible ring which is seated in a groove formed in the external surface of the piston body. The groove is machined in the piston body after the piston body has been formed.

SUMMARY OF THE INVENTION

From one aspect, the present invention relating to a method of making a piston wherein a pressing operation is performed on substantially flat metal stock to form a recess in the stock at one face thereof, a cup is formed by drawing or pressing a portion of the stock which includes the recess, the recess being incorporated in a side wall of the cup at the inside of the cup, there is formed a ring which is resiliently deformable, relative to the cup, the ring having, when unstressed, a first end portion with an outside diameter exceeding the outside diameter of the cup and a second end portion having an outward projection and wherein the second end portion of the ring is inserted into the cup to seat the projection in the recess of the cup and leave the first end portion of the ring protruding from the cup.

The cup may have an imperforate bottom. Alternatively, there may be at least one opening at the bottom of the cup to permit flow of fluid through the piston. Furthermore, the cup may be attached to a stem of the piston.

The drawing or pressing operation preferably completes formation of the cup from the stock. Forming of the recess by a pressing operation performed on the flat stock enables machining operations on the cup to be avoided.

The ring is preferably a snap-fit in the cup.

After the ring has been inserted into the cup, the piston is preferably confined within a cylindrical wall which constrains the first end portion of the ring to a circular shape and thereby prevents the deformation of the ring which would enable the projection to escape from the recess of the cup. It will be understood that, if the first end portion of the ring is not confined and is therefore free to adopt an approximately elliptical shape, the ring may be deformed sufficiently to withdraw the projection from the recess.

According to a further aspect of the invention, there is provided a piston comprising a metal cup and a ring which is resiliently deformable relative to the cup, wherein a first portion of the ring protrudes from the cup, a second portion of the ring lies inside the cup and a projection on the second portion lies in a recess in a side wall of the cup to retain the second portion in the cup, wherein the cup is formed by a pressing or drawing operation from a flat blank and the recess is pressed into the blank before the blank is formed into the cup.

The piston is preferably confined within a cylinder in which the piston is contained, the cylinder confining the ring to prevent such deformation of the ring as would permit the projection to leave the recess.

BRIEF DESCRIPTION OF THE DRAWING

An example of a piston embodying the second aspect of the invention and which is produced by a method according to the first aspect of the invention will now be described, with reference to the accompanying drawings, wherein:

FIG. 1 shows a perspective view of the piston with a ring separated from a cup of the piston, FIG. 2 shows a cross-section of certain parts of an assembly incorporating the piston of FIG. 1 and a cylinder containing the piston, the section being in a plane which contains a diameter of the cylinder, and FIG. 3 shows on a smaller scale, a blank from which a cup of the piston is formed.

DESCRIPTION OF PREFERRED EMBODIMENT

The particular piston represented in FIG. 1 is a piston of a door closer. The piston may, for example, be used in a door closer generally as described and illustrated in GB2230050. The piston comprises an elongated stem 11 and respective cups 12 and 13 attached to the stem at opposite ends thereof. The cups 12 and 13 may be identical with each other and only the cup 12 will be described in detail.

The cup 12 of the piston includes a substantially cylindrical side wall 14 and a bottom wall 15 in which there is formed an aperture 16 to permit flow of damping fluid through the piston. There is associated with the cup 12 a valve 24 for controlling flow of fluid through the aperture 16 as in known door closers. The bottom wall 15 may include an annular rib.

The piston further comprises a circular ring 17 which is resiliently deformable relative to the cup 12. The cups 12 and 13 and the stem 11 are typically formed of metal, preferably steel. The ring 17 may be formed of a plastics material, for example a thermo-plastic. A first end portion 18 of the ring lies outside the cup 12 and, in the unstressed condition, has an outside diameter which is slightly greater than the outside diameter of the cup. A second end portion 19 of the ring lies inside the cup and engages the side wall 14.

The cup and the ring have a complimentary recess and projection for retaining the ring in the cup. In the example illustrated, the recess is formed in the side wall 14 at the inside of the cup and the projection is formed on the second end portion 19 of the ring. Also in the example illustrated, both the recess and the projection are annular.

The ring 17 is conveniently formed by moulding a suitable plastics material to the required finished size and shape.

The cup 12 is formed from substantially flat strip metal stock. A pressing operation is performed on a length of the stock to produce the blank illustrated in FIG. 3. During this pressing operation, material is cut away from the center of the blank to form the aperture 16, an annular depression 20 is formed in the blank at a face which will be the internal face of the bottom wall 15 and an annular recess 21 is formed in that part of the blank which will become the side wall 14 of the cup. The recess 21 is spaced further from the aperture 16 than is the depression 20 and is at the same face of the blank as is the depression 20.

The blank illustrated in FIG. 3 is subjected to a further operation in which scrap is severed from the periphery of the blank and the blank is drawn or pressed to form the cup 12. This operation completes formation of the cup. It will be noted that the cup is produced by two pressing operations. These may be performed by successive strokes of the same press, the stock being advanced between tools in the press from a first station where the depression 20 and the recess 21 are formed to a second station in which the cup is formed. The recess 21 is formed without cutting away material from the stock.

The cup may be secured to the stem 11 by welding. There is at the outside of the bottom wall 15 of the cup an annular rib corresponding to the depression 20 and the cup may be welded at this rib to the stem.

After the cups 12 and 13 have been welded to the stem 11, the moulded ring 17 is fitted into the cup 12. Generally, only one of the cups will be fitted with a ring but a further ring identical with the ring 17 may be fitted to the cup 13, if required.

On the second end portion 19 of the ring, there is provided an outwardly projecting rib 22 which, in the assembled piston, seats in the recess 21. During assembly of the ring with the cup 12, the ring is deformed from a circular shape to an approximately elliptical shape after the second end portion 19 at one side of the ring has been inserted into the cup. This facilitates movement of the rib 22 at the opposite side of the ring over the internal surface of the side wall 14 to the recess 21. Such deformation of the ring causes the first end portion 18 to project further beyond the side wall 14 in radially outward directions at two positions. This is possible, because the first end portion 18 is not confined.

After the ring 17 has been fitted to the cup 12, the piston is introduced into a cylinder represented at 23 in FIG. 2. The cup 12 is received within the cylinder with a slight clearance. The exact amount of clearance depends upon the exact dimensions of the components of the door closer, these being within prescribed tolerance limits. The internal diameter of the cylinder is slightly less than the outside diameter of the first end portion 18 of the ring, when the ring is in an unstressed condition. Accordingly, the ring bears on the cylinder in a manner to seal the piston with respect to the cylinder. Furthermore, the cylinder constrains the first end portion 18 of the ring to a circular shape. Because the first end portion cannot deform to an elliptical shape, the rib 22 cannot escape from the recess 21 and the ring is retained in assembled relation with the cup 12.

In the unstressed condition of the ring 17, the diameter of the projecting rib 22 is slightly greater than the diameter of the internal surface of the side wall 14 of the cup. The diameter of the rib 22 in the unstressed ring may be substantially equal to or may be somewhat greater than the diameter of the recess 21 of the completed cup. As shown in FIG. 2, the axial dimension of the rib 22 is substantially equal to the corresponding dimension of the recess 21. Accordingly, in the assembled piston, the recess 21 is completely occupied by the rib 22. It will be noted that each of the cups 12 and 13 is circular, as viewed along the axis of the piston; whereas the stem 11 is relatively narrow and has a rectangular transverse cross section in a plane perpendicular to the axis of the piston.

We claim:

1. A method of making a piston wherein a pressing operation is performed on substantially flat metal stock to form a recess in the stock at one face thereof, a cup is formed by drawing or pressing a portion of the stock including the recess, the recess being incorporated in a side wall of the cup at the inside of the cup, there is formed a ring which is resiliently deformable, relative to the cup, the ring having, when unstressed, a first end portion with an outside diameter exceeding the outside diameter of the cup and a second end portion having an outward projection and wherein the second end portion is inserted into the cup to seat the projection in the recess of the cup and to leave the first end portion protruding from the cup.

2. A method accoring to claim 1 wherein the ring is subjected to stress during insertion of the second end portion into the cup and the stress is at least partly relieved when the projection enters the recess.

3. A piston comprising a metal cup and a ring which is resiliently deformable relative to the cup, wherein a first portion of the ring protrudes from the cup, a second portion of the ring lies inside the cup, a projection on the second portion lies in a recess in a side wall of the cup to retain the second portion in the cup and wherein the cup is formed by a pressing or drawing operation from a flat blank and the recess is pressed into the blank before the blank is formed into the cup.

4. A piston and cylinder unit wherein the piston is a piston as defined in claim 3 and the cylinder confines the ring to prevent such deformation of the ring as would permit the projection to leave the recess.

* * * * *

UNITED STATES PATENT AND TRADEMARK OFFICE
CERTIFICATE OF CORRECTION

PATENT NO.   : 5,174,192

DATED        : December 29, 1992

INVENTOR(S)  : Peter E. Brown and Brian W. Perrins

It is certified that error appears in the above-identified patent and that said Letters Patent is hereby corrected as shown below:

On title page, item [56] References Cited, U.S. PATENT DOCUMENTS;
  "2,129,619 8/1938 Longstreet 92/245" should read
  --2,128,619 8/1938 Longstreet 92/245--.

Signed and Sealed this

Sixteenth Day of November, 1993

*Attest:*

BRUCE LEHMAN

*Attesting Officer*   Commissioner of Patents and Trademarks